United States Patent
Brandt et al.

(10) Patent No.: US 8,511,716 B2
(45) Date of Patent: Aug. 20, 2013

(54) CONNECTION DEVICE FOR FLUID LINES IN THE REGION OF A WALL DUCT AND WALL ELEMENT

(75) Inventors: Josef Brandt, Wipperfürth (DE); Sascha Rosenfeldt, Dortmund (DE); Ulrich Hiltemann, Wermelskirchen (DE); Martin Lechner, Lindlar (DE)

(73) Assignee: VOSS Automotive GmbH, Wipperfürth (DE)

( * ) Notice: Subject to any disclaimer, the term of this patent is extended or adjusted under 35 U.S.C. 154(b) by 141 days.

(21) Appl. No.: 12/990,394

(22) PCT Filed: Apr. 24, 2009

(86) PCT No.: PCT/EP2009/054930
§ 371 (c)(1),
(2), (4) Date: Oct. 29, 2010

(87) PCT Pub. No.: WO2009/133020
PCT Pub. Date: Nov. 5, 2009

(65) Prior Publication Data
US 2011/0037252 A1     Feb. 17, 2011

(30) Foreign Application Priority Data
Apr. 29, 2008   (DE) .................... 20 2008 005 929 U (51) Int. Cl.
*F16L 3/04*     (2006.01)
(52) U.S. Cl.
USPC .................. 285/140.1; 285/202; 285/921
(58) Field of Classification Search
USPC ............. 285/193, 194, 202, 203, 204, 140.1, 285/139.2, 139.3, 921
See application file for complete search history.

(56) References Cited

U.S. PATENT DOCUMENTS

| | | | | |
|---|---|---|---|---|
| 3,232,644 A * | 2/1966 | Pfeifer et al. | ................. | 285/194 |
| 3,568,977 A * | 3/1971 | Nelson | ........................ | 285/140.1 |
| 4,324,503 A * | 4/1982 | Sevrence | ................... | 285/140.1 |
| 4,762,343 A * | 8/1988 | Hirohata | ................... | 285/140.1 |
| 4,981,310 A * | 1/1991 | Belisaire | .................... | 285/140.1 |
| 5,692,783 A * | 12/1997 | Watanabe et al. | .......... | 285/140.1 |
| 5,951,059 A * | 9/1999 | Kitamura | ................... | 285/140.1 |
| 6,902,206 B2 * | 6/2005 | Zenko et al. | ............... | 285/140.1 |
| 7,055,867 B2 * | 6/2006 | Faller | ............................ | 285/204 |

(Continued)

FOREIGN PATENT DOCUMENTS

| | | |
|---|---|---|
| DE | 29 51 395 | 7/1981 |
| DE | 42 33 167 | 4/1994 |
| DE | 103 32 035 | 2/2004 |

*Primary Examiner* — David E Bochna
(74) *Attorney, Agent, or Firm* — Brinks Hofer Gilson & Lione (57) ABSTRACT

A connection arrangement for a wall passage, in particular for positioning with a through-opening of a wall element and for the connection of at least one media conduit. The connection arrangement including a connector part with a first connection section that is to be passed through the through-opening, and an oppositely placed second connection section with a contact element for limiting the amount of insertion at the wall element, as well as with a retaining element for locking the connector part in its assembly position, where it is inserted into the through-opening. The connector part includes at least two separate parts, an installation part for retention in the through-opening of the wall element and a connection part, which can be connected to the installation part, and which further contains the connection sections.

20 Claims, 6 Drawing Sheets

(56) References Cited

U.S. PATENT DOCUMENTS

| | | | |
|---|---|---|---|
| 7,083,202 B2 * | 8/2006 | Eberle et al. | 285/140.1 |
| 7,222,885 B2 * | 5/2007 | Tincknell et al. | 285/140.1 |
| 7,240,700 B2 * | 7/2007 | Pangallo et al. | 285/140.1 |
| 7,325,838 B2 * | 2/2008 | Gardner et al. | 285/140.1 |
| 7,472,929 B2 * | 1/2009 | Fattorusso et al. | 285/140.1 |
| 7,963,567 B2 * | 6/2011 | Gallardo et al. | 285/140.1 |

* cited by examiner

Fig. 8

CONNECTION DEVICE FOR FLUID LINES IN THE REGION OF A WALL DUCT AND WALL ELEMENT

BACKGROUND

The present invention concerns a connection arrangement for a wall passage, and more specifically, to a connection arrangement for the passage of a media through the wall passage.

DE 29 51 395 A1/C2 describes a fastening means for wall bushings, where a connector part (a so-called bulkhead plug) is installed, starting at one side of the wall until it contacts a contact flange, which has been inserted into an opening of a wall and is locked in place by retaining means. In the process, the retaining means are to be mounted as separate parts on the other side of the wall by means of inserting them into the first connection section; but this can be problematic depending on the installation situation, because it is necessary to install it simultaneously from two sides, and it may, therefore, require two persons to install it.

Something similar also applies to one of the through-connections described in DE 42 34 262 A1, where adjacent to the first section, which is inserted through the wall opening, a spring element must be installed by means of a nut.

The present invention is based on the task to create a connection arrangement of the type described, which guarantees improved usability properties with a configuration that is simple in design and easy to manufacture.

SUMMARY

Thus, it is contemplated according to the invention, that the connector part includes at least two separate parts, and specifically an installation part for supporting it in the through-opening of the wall element and a connection part that can be connected to the installation part, which contains the connection sections. Thus, initially only the installation part can be assembled—independent from the connector part—in the wall through-opening, for which the installation part contains the contact element, which limits the amount of insertion, and the retaining means. Subsequently, the connection part can be connected to the pre-installed installation part. This can be done especially simply and quickly, if the connection part can be plugged into a receiving opening of the installation part by means of a plug-in section and can be locked against being loosened by means of retaining means. Alternatively, the connection part can also be first connected to the installation part, if so desired, and then the installation part can be fastened, together with the connector part, in the wall opening.

In an advantageous configuration, the connection part can be further subdivided into several, in particular two, separate parts, each of which contains one of the connection sections. The two individual connection parts can be inserted into the installation part from opposite sides and connected to each other by way of a plug-in connection.

By means of the multiplicity of parts of the connector part according to the invention, each individual part can be optimally designed for its specific task. Thus the installation part can be advantageously made as a molded part made of plastic, while the locking means for locking the connector part in the through-opening of the wall element can be formed by locking elements of the installation part, which can be fed through the through-opening in such a manner that they automatically reach behind the wall element for holding it in place. The locking means includes, preferably, at least two elastic locking arms, which—in the form of barbed hooks—can be moved elastically to the inside when they are installed into and being passed through the through-opening, and the free ends of which subsequently spring back, which ends point against the installation direction, and thus reach behind the wall element on the side opposite to the contact element and lock it in place. By means of this preferred design, the installation or pre-installation can be accomplished advantageously by a simple insertion from one side of the wall element. No retaining elements need to be mounted from the other side, because during installation the locking means or the locking arms, respectively, automatically—and form-fittingly—reach behind the wall in the edge region of the through-opening in a direction opposite to the direction of insertion. The subsequent installation of the connection part can also be carried out very quickly and simply, because it simply needs to be plugged into the pre-mounted assembly part.

Because of the multiplicity of parts, the components can, furthermore, be formed of the same materials, if so desired, or, however, also of different materials. Thus, it can also involve a so-called "hybrid-configuration", where the assembly part is made preferably of plastic and the connection part at least partly of metal, in particular a non-ferrous heavy metal such as brass.

In a further advantageous design, the connection part can be conceived of as a through-connection for two connected or connectable media conduits, which are joined to the connection sections. As an alternative to this, it can also advantageously involve a maintenance connection to be used if needed, such as, for example, a so-called test connection, especially for pressure measurement, or a fill connection for adding or removing a medium. In this process, one of the connection sections is designed for the connection of a maintenance or measurement conduit, where a check valve is provided preferably between the connection sections within the connector part.

According to a partial aspect of the invention, the installation part according to the invention and a wall element containing at least one through-opening are fitted to each other in such a manner, that on the one hand an attachment of the installation part is achieved that is secured against twisting in the through-opening. On the other hand, the installation part can be installed in several different angular orientations in the through-opening. This is especially advantageous if the connector part is fashioned as a so-called angle iron, and particularly for the directional adjustment of each of the conduit exit openings. In this process, the connection between the connection part and the installation part should be secured against relative twisting.

BRIEF DESCRIPTION OF DRAWINGS

On the basis of the preferred examples of embodiments shown in the drawing, the invention, advantageous designs, and the advantages achieved, will be explained more precisely. What is shown is.

DETAILED DESCRIPTION

In the various figures of the drawing, like parts and components are always given the same reference sign. It will therefore be understood that features shown with one embodiment can be utilized with the other embodiments, unless set out to the contrary herein.

Figures 1, 2, 3, 4, 5:
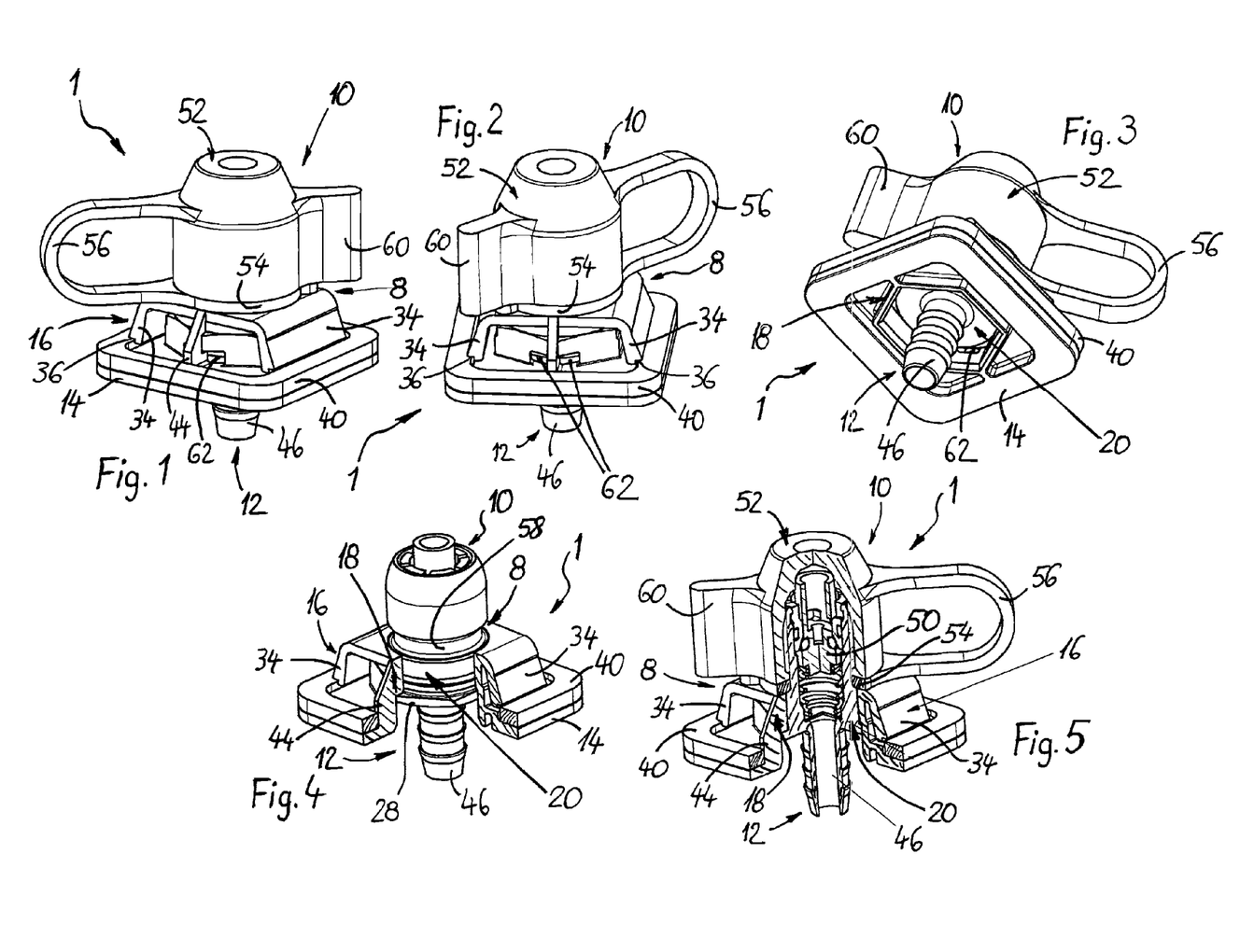
FIG. 1 is a perspective view of a first embodiment of a connection arrangement according to the invention.
FIG. 2 is an alternative perspective view of the connection arrangement seen in FIG. 1.
FIG. 3 is a further alternate perspective view of the connection arrangement seen in FIGS. 1 and 2.
FIG. 4 is a partially sectioned perspective view of the connection arrangement seen in FIG. 1, with its protective cap removed.
FIG. 5 is a further sectioned perspective view of the connection arrangement seen in FIG. 1 with the protective cap.
Figure 6:
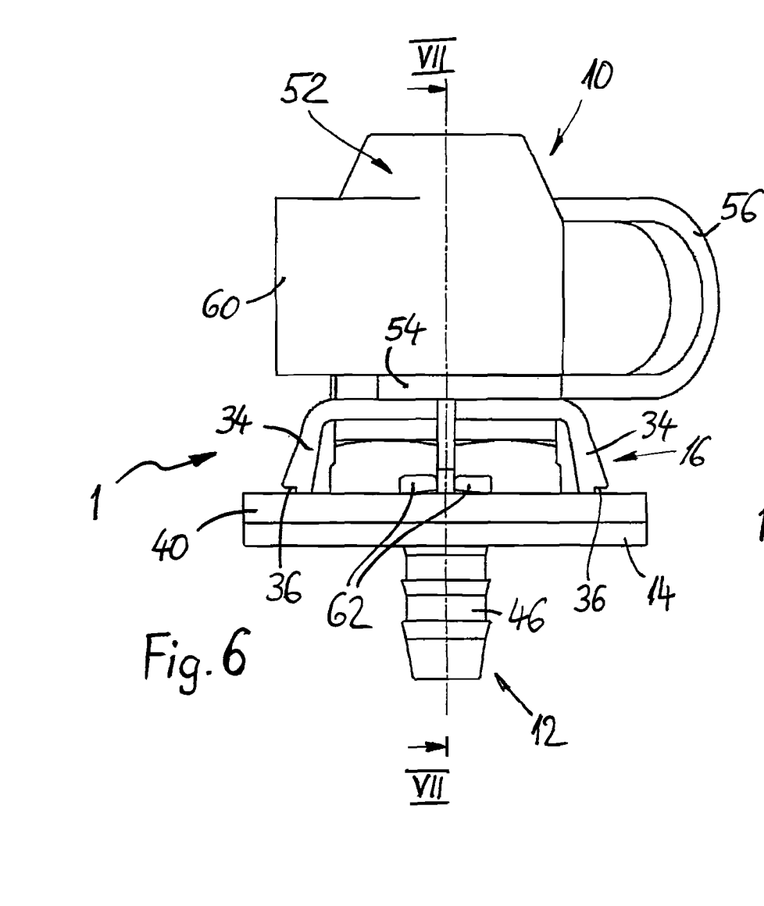
FIG. 6 is an enlarged side view of the protective device according to FIGS. 1 to 5.
Figure 7:
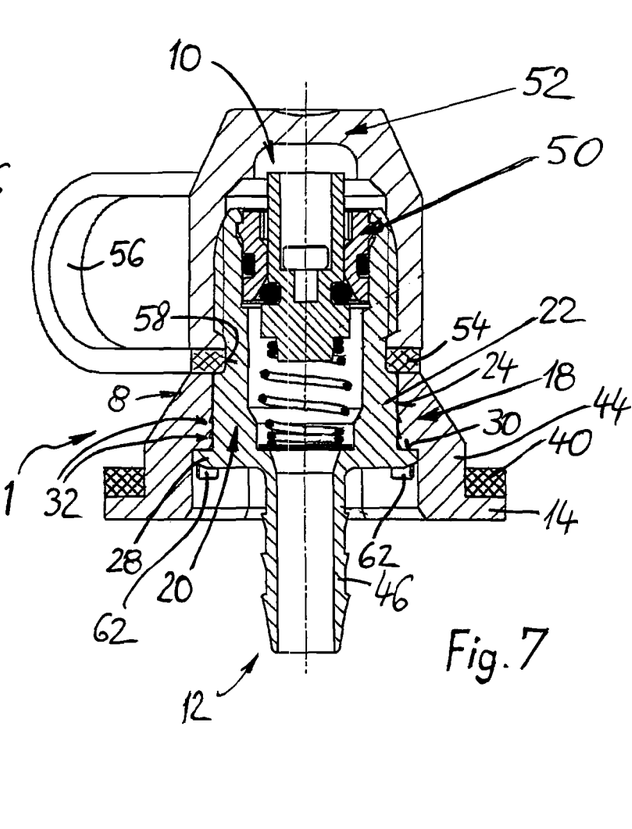
FIG. 7 is a longitudinal section view generally along the VII-VII plane defined in FIG. 6.
Figure 8:
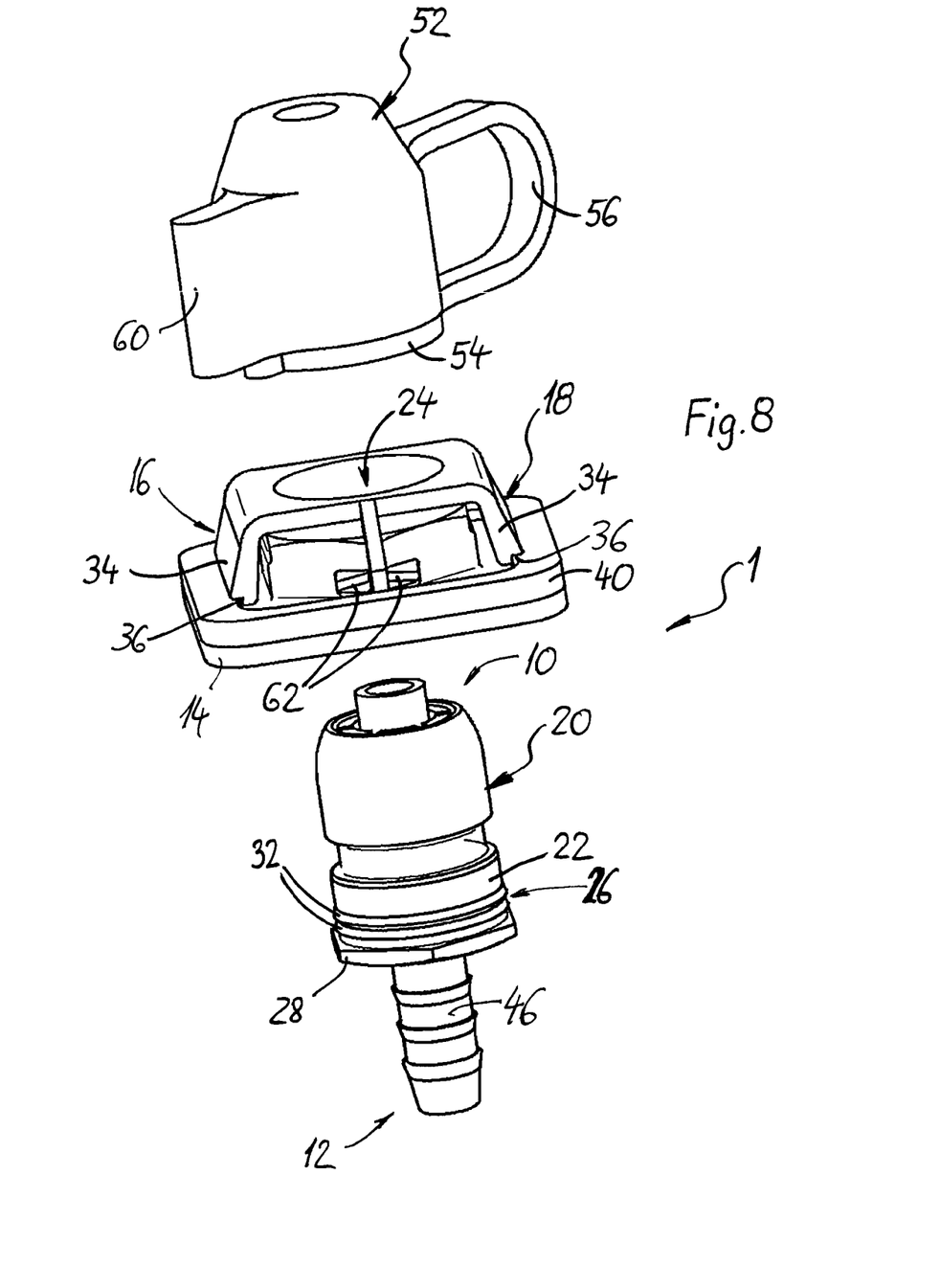
FIG. 8 is an exploded view of the individual parts of the connection arrangement seen in FIGS. 1 to 7.
Figure 9:
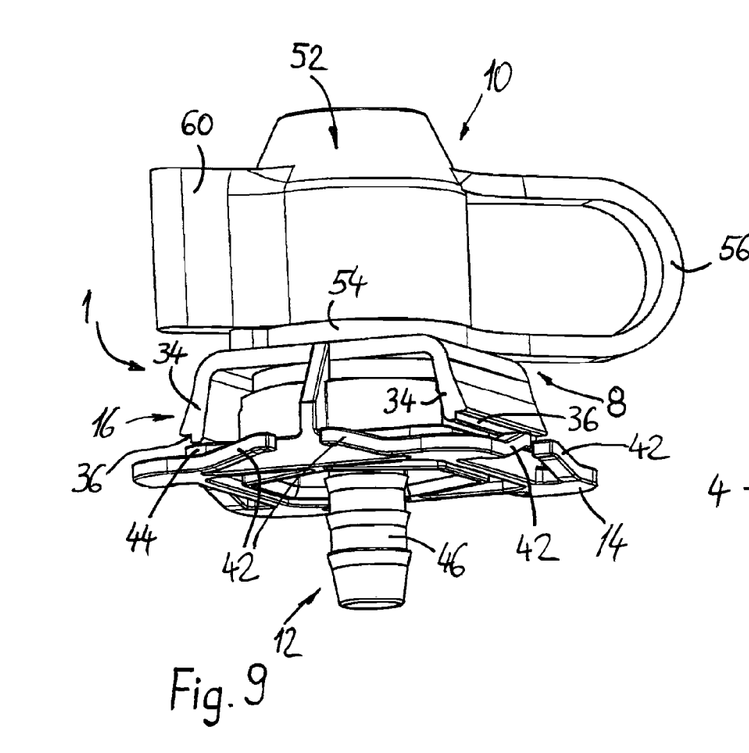
FIG. 9 is a perspective view of a variation of an embodiment of the connection arrangement.
Figure 10:
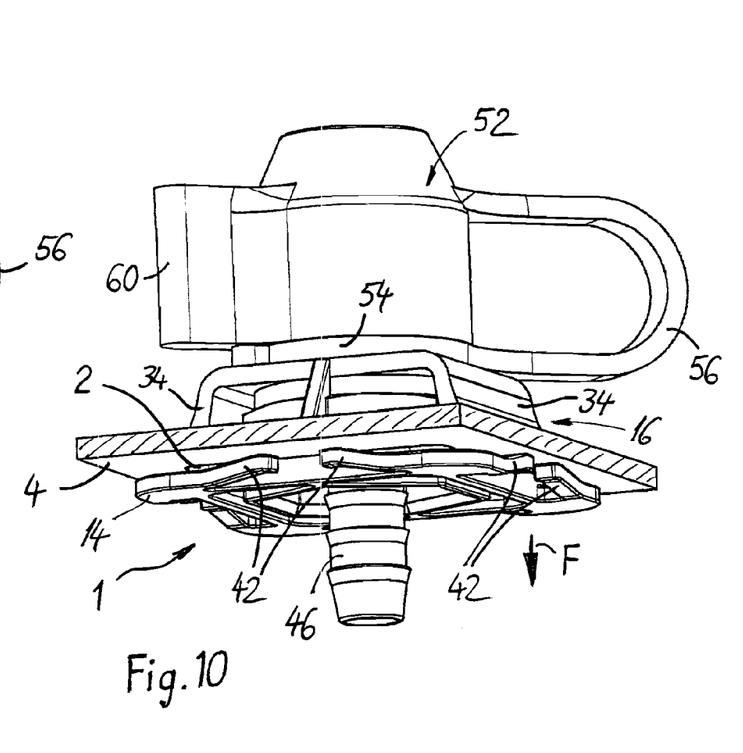
FIG. 10 is a perspective view of the connection arrangement according to FIG. 9, as installed with a part of the wall element.
Figures 11, 12:
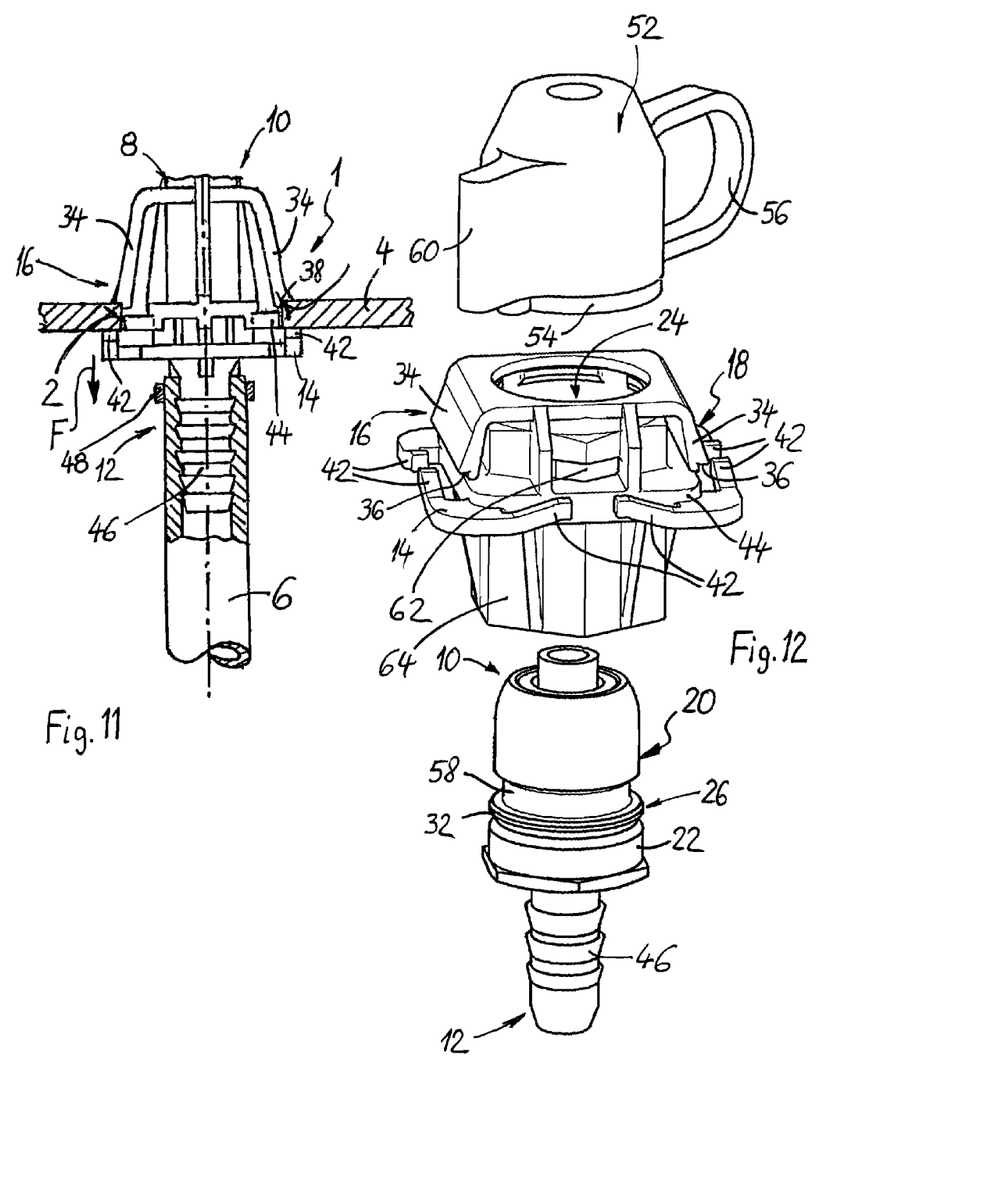
FIG. 11 is a longitudinal section, analogous to FIG. 7, of a further embodiment of a connection arrangement in the installed state, where it is installed in a wall element and with a media conduit connected thereto.
FIG. 12 is an exploded view, analogous to FIG. 8, of a further variant of the connection arrangement according to the invention.

A connection arrangement 1 according to the invention is designed for the preferably sealed arrangement in a through-opening 2 of a wall element 4 (see FIGS. 10 and 11) and thus for the connection of at least one media conduit 6 (only shown in FIG. 11). In the case of wall element 4, it involves in particular a partition wall in a vehicle, for example in a truck. In the case of the/each media conduit 6, it can involve a hose or a pipe for any pneumatic or hydraulic flow or pressure media.

The connection arrangement 1 includes of a connector part 8 (also called a bulkhead plug) with a first connection section 10, which can be fed through the through-opening 2, and a second connection section 12 with a flange-like contact element 14 for an insertion-limiting stop at the wall element 4 in a region of the device surrounding the through-opening 2. Further, retention means 16 are provided for retaining the connector part 8 in its assembled position in the through-opening 2 (see FIGS. 10 and 11).

According to the invention, the connector part 8 consists of at least two separate parts, and specifically—you are being referred here especially to FIGS. 4, 5, 7, 8 and 12—an installation part 18 for the retention of the wall element 4 in the through-opening 2 of the wall element 4 and connection part 20, which can be connected to the installation part 18 and which includes the connection sections 10, 12. The installation part 18 includes the contact element 14 and the retaining means 16. Usefully, the connection part 20 with a plug-in section 22 can be inserted into a receiving opening 24 of the installation part 18 and it can be locked by means of retention means 26 from coming loose. The plug-in section 22 and the receiving opening 24 are preferably designed so as to have circular cross sections, while the receiving opening 24 is formed as a central, axial through-opening in the installation part 18. Thus, initially only the installation part 18 can be inserted into the through-opening 2 of the wall element 4 and attached there (pre-mounted). Subsequently, it is only necessary to insert the connection part 20 into the receiving opening 24 on the installation part 18 (however, this can also be done prior to the insertion of the installation part). This insertion is limited by providing the connection part 20 with a protrusion 28, which protrudes radially to the outside and comes into contact with an inner radial annular step 30 of the installation part 18 (see especially FIG. 7 as well as FIGS. 4 and 5). As a retention means 26, the connection part 20 contains preferably at least one toothed edge 32, which extends along the outer peripheral surface in the region of the plug-in section 22 and engages by means of a force-fit or a form-fit the connection part 20 at the inner peripheral surface of the receiving opening 24 of the installation part 18. As can be seen especially from FIG. 7, preferably two axially spaced toothed edges 32 are provided. But in principle—as a kind of "kinematic reversal"—this can also be reversed (toothed edge(s) in the receiving opening 24 and preferably a corresponding retaining groove at the connection part 20). Furthermore, the connection part 20 can also have a cross section which deviates from the circular form, for example a polygon. The same is then also applicable to the receiving opening 24.

For fastening the connector part 8 in the through-opening 2 of the wall, the installation part 18 includes locking means suitable to function as retaining means 16—especially in the form of at least two spring-elastic locking arms 34—which are designed in such a manner, that they can be fed through through-opening 2 and then, automatically locking it, reach behind the wall element 4 in order to lock it. For this purpose, the locking arms 34 are connected at one end, and in particular as an integral part of it, to the installation part 18, and specifically in a region that is at an axial distance from the contact element 14, from which they extend with their free ends in a direction opposite to the insertion direction and back in the direction of the contact element 14, and in doing so—in the manner of barbed hooks—extend somewhat obliquely toward the outside, so that they, while they are being inserted are moved automatically by way of the interior edge of the opening of the through-opening 2, elastically toward the inside, until they are released on the other side of the wall element 4 and can spring back toward the outside, and thus reach behind the edge of the opening with their free ends and lock it in a form-fitting manner. (see especially FIG. 11).

In an advantageous embodiment, locking means for holding the locking arms 34 in place against an elastic loosening movement are contemplated. This can involve separate elements, which are not shown in the drawing, which, for example, can each be inserted in a gap, which is generated radially between the connection part 20 and each of the locking arms 34. In the shown, preferred embodiments, however, the locking arms 34 contain at their free ends as securing means each a groove- or slot-like contour 36 for the locking interaction with an edge 38 of the through-opening 2 for the purpose of providing support in an axial and radial direction. For this, FIG. 11 should be referred to.

In connection herewith it is advantageous, if the pretensioning means for the generation of an axial pretensioning force F, acting in an opposite direction to the insertion direction (see FIGS. 10 and 11), are present in such a configuration, that the connector part 8 is held axially without play, and the locking arms 34 are kept in contact with the edges 38 of the through-opening 2. With regard to this, the embodiments according to FIGS. 1 to 8 will now be referred to, according to which an elastic axial seal 40 is preferred as a pretensioning means for achieving a sealing contact in the region between the contact element 14 and the wall element 4. Alternatively or additionally a radial seal is also possible (not shown), which is disposed in such a manner, that it interacts with the inner region of the through-opening 2 in a sealing manner.

Especially in combination with a radial seal, at least one axial spring element can be provided according to FIGS. 9 to 12, which can be formed as a separate element, but preferably as elastic arm sections 42, which are an integral part of the installation part 18, and which are brought into contact at the lower side under pretension at the wall element 4 (FIG. 10). In principle, an additional axial spring element can also be used in the case of an axial seal 40.

Also advantageous is further an embodiment of the connection arrangement 1 which is safeguarded against twisting of the connector part 8 in the through-opening 2 of the wall element 4. To achieve this, the through-opening 2 has, on the one hand, a shape which deviates from the circular shape, especially a shape configured as a regular polygon. On the other hand, the installation part 18 contains on the side pointing in the direction of the first connection section 10, i.e. on the side of the contact element 14 pointing in the insertion direction, an engagement section 44 having a shape which is adapted to the shape of the through-opening 2 in such a manner, that the engagement section 44 can be inserted into the through-opening 2 with little play, but cannot be twisted in it. This is advantageous for angled conduit exits for adjustment of direction. In the example of the embodiment shown, the through-opening 2 has the shape of a regular rectangle, i.e. the form of a square, so that the installation part 18 can be turned in four different angular directions, in steps of 90°. Alternatively to this, the through-opening 2 can, however, for example, also be shaped as a regular hexagon or octagon. Preferably the installation part 18 contains two (only two) diametrically opposed locking arms 34, which are relatively broad and fashioned in such a manner that the free ends form retaining edges, which are nearly of the same length as the edges 38 of the through-opening 2, which are parallel to it. By this means, advantageously, a high level of safety against tilting of the connector part 8 or the installation part 18 inside the through-opening 2 is achieved.

Advantageously, the installation part 18 consists of a molded part, especially one of fiber-reinforced plastic. Especially useful is a one-piece construction as an injection-molded part. Here, the fabrication of the installation part 18 as a multi-component molding made of different plastics is also possible. By this means, especially the seal 40 can be fabricated in one piece from an elastic material. In a special design, the seal 40 can consist, for example, of cellular rubber or foam rubber and have a frame-like and possibly even an annular contour.

The connection part 20 can either also be made of plastic, but preferably of metal, especially a non-ferrous metal like brass. This is of special advantage for the attachment of the connection part 20 in the receiving opening 24 of the installation part 18, because the preferably used toothed edges 32 dig (cut) very strongly and practically undetachably into the plastic material of the installation part 18.

The connection part 20 contains at least in the region of the second connection section 12 a conduit connection 46 of an optional design and orientation. As is shown as an example, the conduit connection 46 can consist of a typical flared profile for attaching a conduit 6 (see for this FIG. 11), where for the retention additionally a clamping collar can be provided. The conduit 6 can already be connected (flared out) prior to the mounting of the connector part 8, and the insertion of the connection 8 into the though-opening 2—or the insertion of the connection part 20 into the pre-assembled installation part 18—can advantageously be done while conduit 6 is connected.

Figure 13:
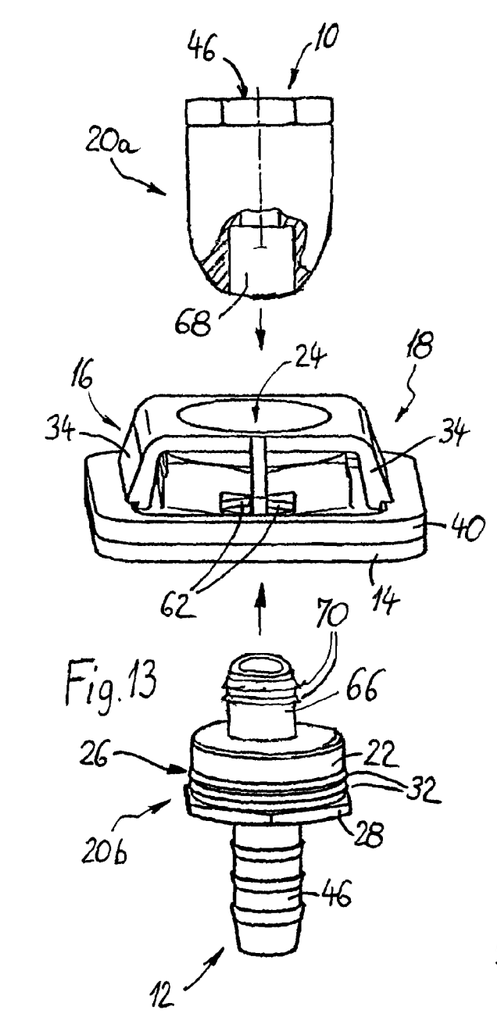
FIGS. 13 and 14 are each a further embodiment of the connection arrangement, in an exploded view.
Figure 14:
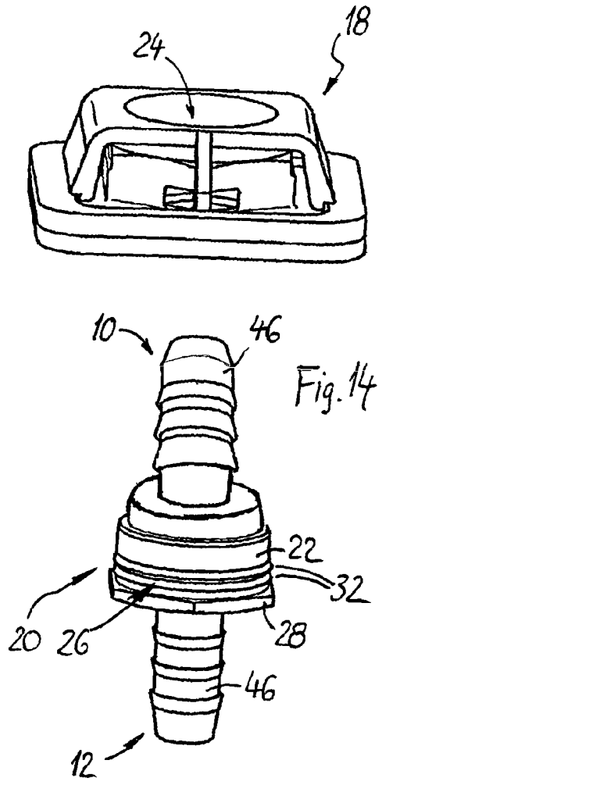

The connector part 8 or the connection part 20, respectively, can, for example, in the configurations shown in FIGS. 13 and 14 be fashioned as media through-put connections, where the connection sections 10, 12 are permanently connected by way of an inner passage of the connection part 20. Here the first connection section 10 also contains a conduit connection 46, which according to FIG. 13 can preferably be constructed as part of a quick-disconnect system, and in fact as a receiving bushing for the insertion of quick-disconnect part, not shown, which can be connected to a conduit. According to FIG. 14 both conduit connections 46 can be constructed as spike profiles for the insertion of each into a conduit. Between the individual conduit connections 46 any one- or multi-dimensional directional misalignment can be provided for (compare in FIG. 14 the angularly oriented "upper" conduit connection 46 of the first connection section 10).

In the remaining embodiments shown (FIGS. 1 to 12 and 14), the connection arrangement 1 or, respectively, the connector part 8 is fashioned as a maintenance connection, e.g. a test connection, especially for the measurement of pressure. At one of the connection sections, as shown, but preferably at the second connection section 12, a pressurized—media conduit 6 can be connected. The other, as shown, which is preferred for the first connection section 10, is constructed, for example, for the connection to a test conduit leading to a pressure measuring device. The test line and the measuring device are not shown in the drawing. Between the connection sections 10, 12 a, check valve is 50 is located inside the connection part 20. This is pointed out in FIGS. 5 and 7. This check valve 50 is constructed—according to the design of an air tire input valve—in such way, that in the case of an unconnected test conduit, the media conduit, which is connected to the second connection section 12, is closed automatically by the pressure, which is exerted in the direction of the connection conduit of the measurement conduit, and that the check valve 50 is automatically opened against the pressure by connecting it to the measurement conduit, so that the pressure can now reach the measuring device by way of the measurement line. In a corresponding manner a medium can also be added or removed by way of the maintenance connection and a maintenance conduit, which can be connected to it as needed (e.g. a fill conduit).

In a preferred embodiment, the first connection section 10 is equipped in these configurations with a protective cap 52 in order to protect the maintenance connection at its connection side from dirt and other influences. As is hinted at as an example in FIGS. 5 and 7, the protective cap 52 can be fashioned as a screw cap, which with its interior thread can be screwed onto an exterior thread of the connection section 10 of the connection part 20. In the other embodiments, the protective cap 52, which consists preferably of a flexible, elastic plastic material, is inserted only into the connection section 10 and locked in place. For the secure attachment to the connector part 8, the protective cap 52 contains a retaining ring 54, which encloses the connection section 10, while the retaining ring 54 is connected by way of a flexible band- or loop-like connection section 56, which is connected in one piece with the protection cap 52. The retaining ring 54, which additionally also can function as a seal between the protective cap 52 and the installation part 18 (compare with FIGS. 5 and 7), can be seated in a groove-like annular recess 58 of the connection part 20 (see FIGS. 4, 7 and 12). In order to make it easier to put on and remove the protective cap 52, a radial protrusion 60 can be located on the side diametrically opposite the connection section 56 as a handling means.

As is further seen from FIGS. 1 to 7, in an advantageous embodiment of the invention it is further contemplated, that the conduit connection 46 of the second connection section 12 of the connection part 20 is in certain regions recessed within the receiving opening 24 of the installation part 18 in such a manner, that when the connector part 8 is mounted and retained in the through-opening 2 of the wall element 4, at least one bottom portion of this conduit connection 46 is visible from the opposite side through at least one lateral sight opening 62 of the installation part 18. This design facilitates advantageously a mounting control, in order to determine if a media conduit 6 has been correctly plugged in (flared) far enough from the conduit connection 46. Furthermore, this recessed arrangement also leads to an advantageous savings of construction space and material of the inner connection part 20, which is a special advantage in the case of the preferred fabrication from a metal, such as brass, as described.

In a further arrangement, shown in FIG. 12, the installation part 18 contains a protective element 64, which is molded in place in one piece, and which encloses the second wall section 12 or the conduit connection 46 of the connection part 20 in a lateral direction and coaxially as a kind of wall with a lateral spacing. This protective element 64 protects the conduit connection 46 effectively against lateral forces and damage, which could occur at the installation location by colliding parts after it has been installed.

As is shown in FIG. 13, the connection part 20 can be still further subdivided into (at least) two individual parts 20a, 20b, which each contain one of the connection sections 10, 12 and which are preferably connected or connectable to each other by way of a plug-in connection. The plug-in connection consists of a plug-in section 66 of one part (e.g. 20b), which is peripherally sealed and can be plugged into a receptor plug 68 of the other part (e.g. 20a). In doing this, the parts 20a, 20b are usefully introduced into the receiving opening 24 of the installation part 18 from opposite sides and plugged into each other. In order to prevent loosening, retaining means, especially in the form of at least one toothed edge 70 of the plug-in section 66 can be provided.

Figure 15:
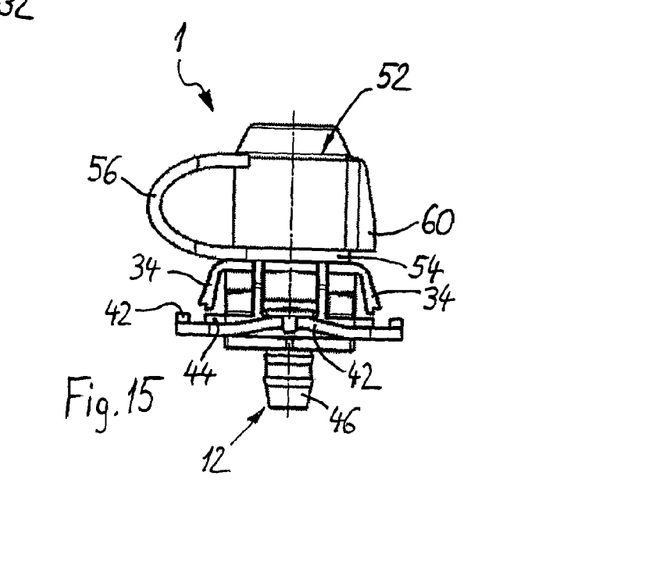
FIG. 15 is a variation of the embodiment generally seen in FIGS. 9 and 10.

In the design according to FIG. 15, the protrusion 60 and preferably also the connection section 56 of the protective cap 52 are reduced in size relative to the other designs in such a manner, that the connector part 8 together with the installed protective cap 52 are the first to be fed through the through-opening 2 of the wall.

As has already been indicated at the outset, the invention also relates to the wall element 4, which has at least one through-opening 2. Here, the through-opening 2 is constructed with regard to its size and shape according to the invention in such a manner, that the installation part 18 with the locking arms 34 can be passed through the through-opening 2. As has likewise already been explained, the through-opening 2 of the wall element 4 according to the invention has a shape deviating from the circular shape, and in particular it has the shape of a regular polygon so that the engagement section 44 of the installation part 18 can be inserted with little play and is protected in the installed condition against twisting. Further, an insertion in different rotational orientations is possible.

The invention leads to a significant reduction in cost and weight as compared to earlier known completely metallic and threaded connections. The connection arrangement 1 can be easily installed manually by plugging it in, or it can also be disassembled by means of a suitable tool (wrench) by pushing the locking arms 34 together.

This invention is not limited to the examples of embodiments shown and described, but it also includes all designs, which perform similarly within the scope of the invention. Thus, the claims as well are merely to be understood as an attempt of formulating the invention.

The invention claimed is:

1. A connection arrangement for arrangement in a through-opening of a wall element and connection of at least one media conduit thereto, the connection arrangement comprising:
a connector part having two separate parts being a connection part of metal and an installation part of fiber-reinforced plastic, the installation part configured to retain the connection part in the through-opening, the connection part configured to be connected to the installation part and including a first connection section, which is to be passed through the through-opening, and an oppositely located second connection section, the installation part including a contact element for insertion-limiting contact with the wall element and a retaining mechanism configured to lock the connector part in its mounting position where it is inserted into the through-opening, the retaining mechanism including at least two elastic arms connected at an end of the installation part that is axially spaced from the contact element, the arms extending outwardly and obliquely back toward the contact element and terminating in free ends so as to define a radially inward gap between the free ends and remaining portions of the installation part, the connection part including a plug-in section plugged into a receiving opening of the installation part and being locked against loosening by means of a retention feature formed on peripheral surface of one of the connection part and the installation part, the retention feature being a circumferential toothed edge that engages a peripheral surface of the other of the connection part and the installation part by way of a force fit or form fit engagement.

2. The connection arrangement according to claim 1, wherein the retention feature is formed on the connection part.

3. The connection arrangement according to claim 1, wherein the retention feature is formed on an outer peripheral surface of the connection part and engages an inner peripheral surface of a receiving opening of the installation part.

4. The connection arrangement according to claim 1, wherein the retaining mechanism is formed as a portion of the installation part and is of a size that can be passed through the through-opening, the retaining mechanism automatically extending behind the wall element after passing through the through-opening in order to lock it in place.

5. The connection arrangement according to claim 4, wherein the at least two elastic locking arms are elastically inwardly moveable when they are passed through the through-opening and subsequently spring back outward with the free ends behind the wall element on the side opposite to the contact element and lock it in place.

6. The connection arrangement according to claim 5, wherein the free ends have a recessed contour for the locking interaction with an edge of the through-opening for the purpose of providing support in the axial and radial direction.

7. The connection arrangement according to claim 1, wherein a pretensioning element is provided for the generation of an axial pretensioning force between the wall element and installation part acting against the direction of insertion.

8. The connection arrangement according to claim 7, wherein an elastic seal is provided in sealing contact in the region between the contact element and the wall element, the seal being the pretensioning element generating the pretensioning force.

9. The connection arrangement according to claim 7, wherein the installation part contains spring-elastic arm sections for generating the pretensioning force.

10. The connection arrangement according to claim 1, wherein the installation part includes an engagement section provided with a shape such that the installation part is prevented from twisting in the through-opening of the wall element.

11. The connection arrangement according to claim 10, wherein the engagement section is provided as an adaptation to the through-opening, which has a shape deviating from the circular shape.

12. The connection arrangement of claim 11, wherein the shape is that of a regular polygon.

13. The connection arrangement according to claim 1, wherein the connector part includes at least one conduit connection in the region of each connection section, at least one of the conduit connections is constructed as a flared connection for plugging in a conduit.

14. The connection arrangement according to claim 13, wherein the conduit connections of the second connection section have recessed portions within the receiving opening of the installation part in such a manner that when the connector part is retained in the through-opening, from an opposite side of the wall element through a lateral sight opening of the installation part at least a bottom portion of a conduit connection is visible when connected thereto.

15. The connection arrangement according to claim 1, wherein the connector part includes at least one conduit connection constructed as an integral part of a plug-in connection, the integral part being a receiving bushing for plugging in a plug-in part on the side of the conduit.

16. The connection arrangement according to claim 1, wherein the connection arrangement is a maintenance connection, of the connection sections being constructed for the connection of a maintenance conduit, and where a check valve is provided between the connection sections within the connector part.

17. The connection arrangement according to claim 1, wherein the connector part contains two oppositely located connections and an inner passage which permanently connects them.

18. The connection arrangement according to claim 1, wherein the installation part contains a protective wall element that encloses the second connection section of the connector part at a lateral distance.

19. The connection arrangement according to claim 1, wherein the connector part is further divided into at least two individual parts that are connected to each other by way of a plug-in connection.

20. A wall element comprising:
portions defining at least one through-opening for the insertion of a connection arrangement, the connection arrangement comprising a connector part having two separate parts being a connection part of metal and an installation part of fiber-reinforced plastic, the installation part configured to retain the connection part in the through-opening, the connection part configured to be connected to the installation part and including a first connection section, which is to be passed through the through-opening, and an oppositely located second connection section, and the installation part including a contact element for insertion-limiting contact with the wall element and a retaining mechanism configured to lock the connector part in its mounting position where it is inserted into the through-opening, the through-opening being constructed with regard to its size and shape in such a manner that the installation part can be guided through the through-opening, the through-opening having a shape deviating from a circular shape and such that engagement sections of the installation part are received in the through-hole with little play and are prevented in their installed condition from rotating within the through-hole, the retaining mechanism including at least two elastic arms connected at an end of the installation part that is axially spaced from the contact element, the arms having free ends extending outwardly and obliquely back toward the contact element so as to define a radially inward gap between the free ends and remaining portions of the installation part, the connection part including a plug-in section plugged into a receiving opening of the installation part and being locked against loosening by means of a retention feature formed on one of the connection part and the installation part, the retention feature including a toothed edge defined on a peripheral surface of the one of the connection part and the installation part and which engages a peripheral surface of the other of the connection part and the installation part by way of a force fit or form fit engagement.

* * * * *